United States Patent
Jonas et al.

(10) Patent No.: US 10,741,345 B2
(45) Date of Patent: Aug. 11, 2020

(54) HUMIDITY WALL CONTROL

(71) Applicant: Broan-NuTone LLC, Hartford, WI (US)

(72) Inventors: Kenneth J. Jonas, Mequon, WI (US); Benjamin Thorpe Puffer, Hartford, WI (US)

(73) Assignee: Broan-NuTone LLC, Hartford, WI (US)

(*) Notice: Subject to any disclaimer, the term of this patent is extended or adjusted under 35 U.S.C. 154(b) by 599 days.

(21) Appl. No.: 14/593,883

(22) Filed: Jan. 9, 2015

(65) Prior Publication Data

US 2016/0201935 A1     Jul. 14, 2016

(51) Int. Cl.
| | |
|---|---|
| *H01H 23/12* | (2006.01) |
| *F24F 11/30* | (2018.01) |
| *G01N 19/10* | (2006.01) |
| *H01H 23/14* | (2006.01) |
| *F24F 110/20* | (2018.01) |

(52) U.S. Cl.
CPC ............ *H01H 23/12* (2013.01); *F24F 11/30* (2018.01); *G01N 19/10* (2013.01); *F24F 2110/20* (2018.01); *H01H 23/145* (2013.01)

(58) Field of Classification Search
CPC ............ F24F 11/0008; F24F 11/0012; F24F 11/0015; G01N 19/10; H01H 23/12; H01H 23/145
See application file for complete search history.

(56) References Cited

U.S. PATENT DOCUMENTS

| | | | | |
|---|---|---|---|---|
| 4,514,722 | A * | 4/1985 | Batcheler | G01N 27/048 324/694 |
| 5,396,796 | A * | 3/1995 | Kotani | G01N 27/121 73/335.02 |
| 6,122,678 | A * | 9/2000 | Eckel | G01K 1/045 340/567 |
| 6,254,008 | B1 * | 7/2001 | Erickson | G05D 22/02 126/113 |
| D490,726 | S | 6/2004 | Eungprabhanth et al. | |
| 6,798,341 | B1 * | 9/2004 | Eckel | G01K 1/045 340/12.32 |
| 6,899,683 | B2 * | 5/2005 | Mault | A61B 5/0833 600/529 |
| 6,935,570 | B2 * | 8/2005 | Acker, Jr. | F24F 11/0001 236/44 R |

(Continued)

FOREIGN PATENT DOCUMENTS

CN         105786040 A     7/2016

OTHER PUBLICATIONS

Leviton "Single Pole Humidity Sensor and Fan Controller", 2014.*

(Continued)

*Primary Examiner* — Nelson J Nieves
(74) *Attorney, Agent, or Firm* — Barnes & Thornburg LLP

(57) ABSTRACT

A humidity monitoring system mountable to a wall has a housing for receiving a humidity sensor. A face plate having an extended portion can be mounted over the housing such that the extend portion is positioned adjacent to the humidity sensor. The extended portion defining a secondary space within which humid air can be pass proximate to the humidity sensor to improve the monitoring of the ambient humid air.

26 Claims, 11 Drawing Sheets

(56) References Cited

U.S. PATENT DOCUMENTS

| | | | |
|---|---|---|---|
| 7,262,705 B2 * | 8/2007 | Back | G08B 17/113 340/628 |
| 7,325,748 B2 * | 2/2008 | Acker, Jr. | F24F 11/0001 165/222 |
| D569,284 S | 5/2008 | Ni et al. | |
| D578,027 S | 10/2008 | Bray et al. | |
| D583,688 S | 12/2008 | Guercio | |
| 7,553,071 B2 * | 6/2009 | Legl | G01D 11/245 374/142 |
| 7,690,583 B2 * | 4/2010 | Cherewatti | F24F 11/0015 236/44 A |
| D616,770 S | 6/2010 | Bhate et al. | |
| D616,771 S | 6/2010 | Bhate et al. | |
| 7,984,859 B2 * | 7/2011 | Goodwin | F24F 7/065 236/44 A |
| 8,089,032 B2 | 1/2012 | Beland et al. | |
| D656,849 S | 4/2012 | Ni et al. | |
| D678,083 S | 3/2013 | Breuer et al. | |
| D692,331 S | 10/2013 | Ni et al. | |
| D706,726 S | 6/2014 | Mathew et al. | |
| D744,960 S * | 12/2015 | Branham | F24F 11/0012 D13/162 |
| D749,966 S | 2/2016 | Ni et al. | |
| D770,919 S * | 11/2016 | Jonas | F24F 11/001 D10/53 |
| 9,501,051 B2 | 11/2016 | Wright et al. | |
| 2002/0023045 A1 | 2/2002 | Feilbogen et al. | |
| 2003/0065472 A1 * | 4/2003 | Eckel | H05B 37/02 702/130 |
| 2006/0065510 A1 * | 3/2006 | Kiko | H01H 9/161 200/1 R |
| 2008/0151458 A1 * | 6/2008 | Beland | G05D 23/1902 361/114 |
| 2010/0101924 A1 * | 4/2010 | Wu | H01H 9/0271 200/339 |
| 2012/0011866 A1 * | 1/2012 | Scarcella | F25B 1/10 62/79 |
| 2013/0020397 A1 * | 1/2013 | Branham | F24F 11/0001 236/44 A |

OTHER PUBLICATIONS

U.S. Appl. No. 29/514,290, Response filed Jan. 8, 2016 to Restriction Requirement dated Nov. 13, 2016, 4 pgs.

U.S. Appl. No. 29/514,290, Notice of Allowance dated Feb. 3, 2016, 7 pgs.

U.S. Appl. No. 29/514,290, Restriction Requirement dated Nov. 13, 2015, 8 pgs.

U.S. Appl. No. 29/540,461 Notice of Allowance dated Jul. 7, 2016, 8 pgs.

U.S. Appl. No. 29/540,461, Response filed Jun. 10, 2016 to Restriction Requirement dated Apr. 13, 2016, 9 pgs.

U.S. Appl. No. 29/540,461, Restriction Requirement dated Apr. 13, 2016, 10 pgs.

U.S. Appl. No. 29/562,654, Restriction Requirement dated Feb. 13, 2017, 8 pgs.

U.S. Appl. No. 29/562,654, Response dated Apr. 13, 2017 to Restriction Requirement, 17 pgs.

Leviton "Single Pole Humidity Sensor and Fan Controller", 2014 Leviton Mfg. Co., Inc., 2 pgs, 2014.

Application Serial No. 201610012089.2, Office Action dated Jul. 5, 2017, 4 pgs.

U.S. Appl. No. 29/562,654, Notice of Allowance dated May 12, 2017, 9 pgs.

U.S. Appl. No. 29/562,654, Amendment after Notice of Allowance dated Aug. 17, 2017, 4 pgs.

Second Office Action Issued in corresponding CN Application 201610012089.2, dated Feb. 9, 2018 (17 pages).

* cited by examiner

HUMIDITY WALL CONTROL

TECHNICAL FIELD

This document pertains generally, but not by way of limitation, to humidity wall controls having a sensor for measuring ambient humidity.

BACKGROUND

Humidity sensors are often installed within rooms with humidity affecting features such as showers, baths, water heaters and other sources of humidity to monitor the humidity within the rooms. The humidity sensors are often operably connected to a humidity control element, such as an exhaust fan, and configured to automatically signal the control element when the humidity in the room exceeds predetermined boundaries. Excessively high or low humidity levels in interior rooms can result in mold growth; insect infestation, rotting of wood, drywall or other structural elements; peeling of paint or wall paper and other undesirable effects. As the humidity created by certain humidity sources can rapidly change the humidity within the room, a primary consideration of humidity sensors is providing an accurate and current measurement of the humidity in the room to minimize the response time between the humidity within the room reaching unacceptable levels and detection of the unacceptable humidity by the sensor.

As humidity gradients often occur within rooms due to the lower density of humid air, humidity sensors are frequently mounted in a wall of the room to elevate the sensors to provide a more accurate humidity measurement of the room as a whole. However, elevating the humidity sensors makes the sensors more visible to people in the room creating an undesirable aesthetic appearance. Sensors or sensor housings that protrude from the wall are often considered particularly undesirable. Accordingly, humidity sensors are often partially or entirely recessed within the wall with a face place flush or nearly flush with the wall to minimize the protrusion of the sensor or housing from the wall. While the recessed sensor improves the aesthetic appearance of the humidity sensor, recessing the sensor frequently hinders the measurement of the ambient humidity by the sensor. As a result, the recessed sensors often have slower response times than sensors protruding from the wall, which correspondingly reduces the effectiveness of the humidity control element in returning the humidity to acceptable levels. In addition, the recessed positioning of the sensors are often sensitive to the humidity of air currents moving within the walls.

Overview

The present inventors have recognized, among other things, that a problem to be solved can include positioning the sensor to minimize response time to unacceptable humidity levels while concealing the sensor to provide a desired aesthetic appearance. In an example, the present subject matter can provide a solution to the problem, such as by providing a face plate that encloses a humidity sensor. The face plate can have an extended portion defining a secondary space proximate the humidity sensor and through which a humid airflow can be drawn over the humidity sensor. The humid airflow over the humidity sensor can improve the accuracy of humidity measurements made by the humidity sensor and reduce response time when humidity levels exceeding predetermined levels are detected. The extended portion can operate as a scoop facilitating the capture of humid ambient air from the room to improve measurement of humid air. The extended portion can be angled such that the face plate resembles a light switch to conceal the humidity sensor. In at least one example, the face plate can be positioned within the switch opening of a light switch panel mounted to a wall such that the face plate conceals the humidity sensor system as a light switch.

In an example, a humidity monitoring system mountable to a wall can include a housing having a housing wall defining an internal space and a front opening. The monitoring system can also include a face plate having an extended portion defining a secondary space. The face plate can be mounted to the housing wall to obstruct at least a portion of the front opening. The monitoring system can also include a humidity sensor positioned within the internal space proximate the front opening. The extended portion of the face plate can be mounted to the housing wall such that the secondary space is positioned proximate to the humidity sensor to define an airflow path over the humidity sensor.

In an example, a light switch assembly mountable to a wall can include a switch plate defining at least two switch openings. The switch plate can be mounted to the wall. The light switch assembly can also include at least one toggle switch positioned within one of the switch openings and a humidity sensor positionable within one of the switch openings. The humidity sensor can include a housing having a housing wall defining an internal space and a front opening. The humidity sensor can also include a face plate having an extended portion defining a secondary space. The face plate can be mounted the housing wall to obstruct at least a portion of the front opening. The humidity sensor can include a humidity sensor positioned within the internal space proximate the front opening. The extended portion of the face plate can be mounted to the housing wall such that the secondary space is positioned proximate to the humidity sensor to define an airflow path over the humidity sensor.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
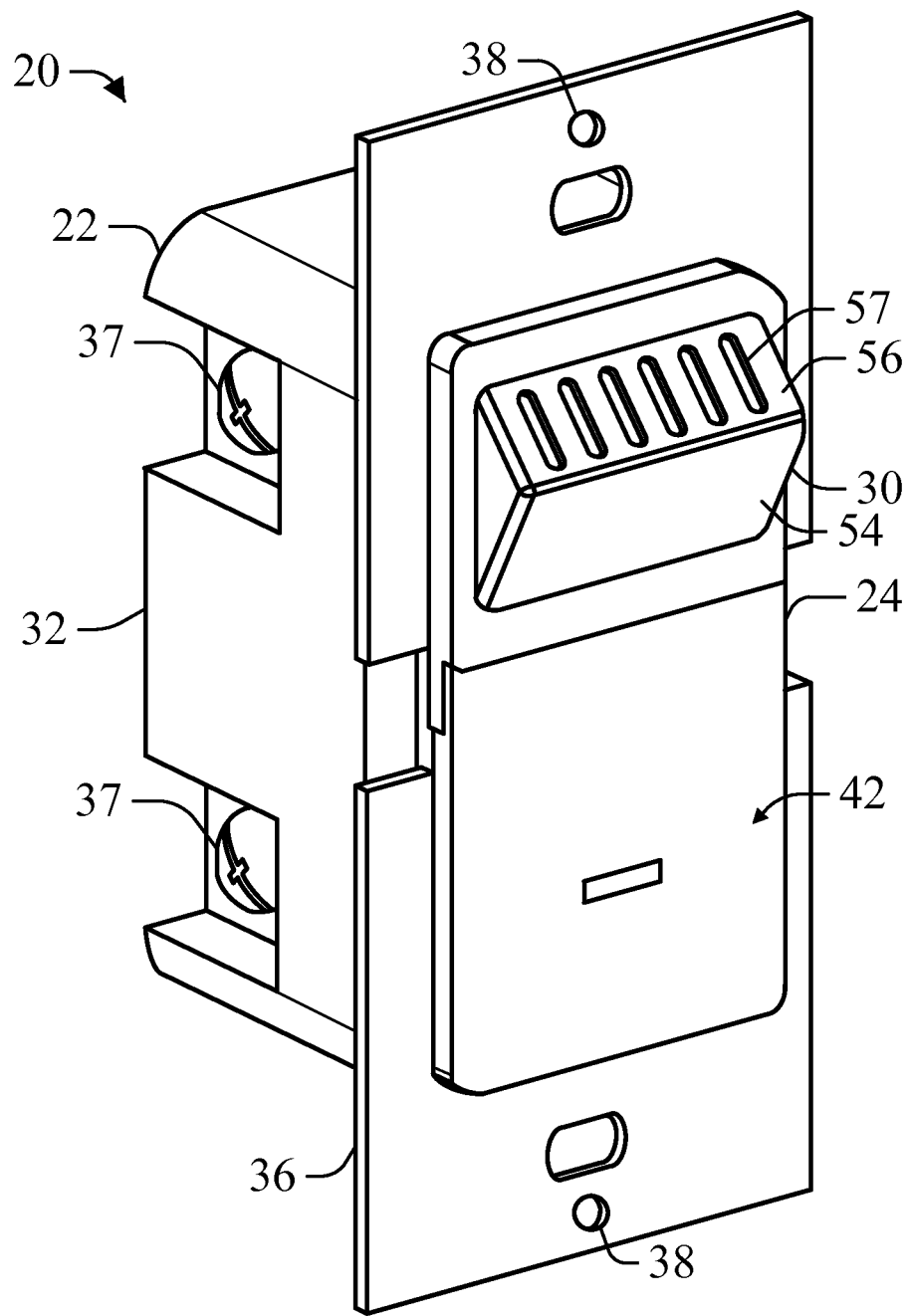
FIG. 1 is a perspective view of a humidity sensor system having inlet openings according to an example of the present disclosure.

As depicted in FIGS. 1-2 and 6-7, a humidity sensor system 20, according to an example of the present disclosure, can include a housing 22, a face plate 24 and at least one humidity sensor 26. The housing 22 can define an internal space and a front opening 28 for accessing the internal space. In at least one example, the at least one humidity sensor 26 can be positioned within the internal space proximate the front opening 28. The face plate 24 can be configured to engage the housing 22 at the front opening 28 to cover the front opening 28 and enclose the internal space and the humidity sensor 26 therein. The face place 24 can include an extended portion 30 that defines a secondary space adjacent the humidity sensor 26. As illustrated in FIGS. 5A-5B and 10A-10B, humid air can flow into the secondary space and over the humidity sensor 26 to improve the accuracy and speed of the humidity measurement of the ambient conditions within the room by the humidity sensor 26.

Figure 2:
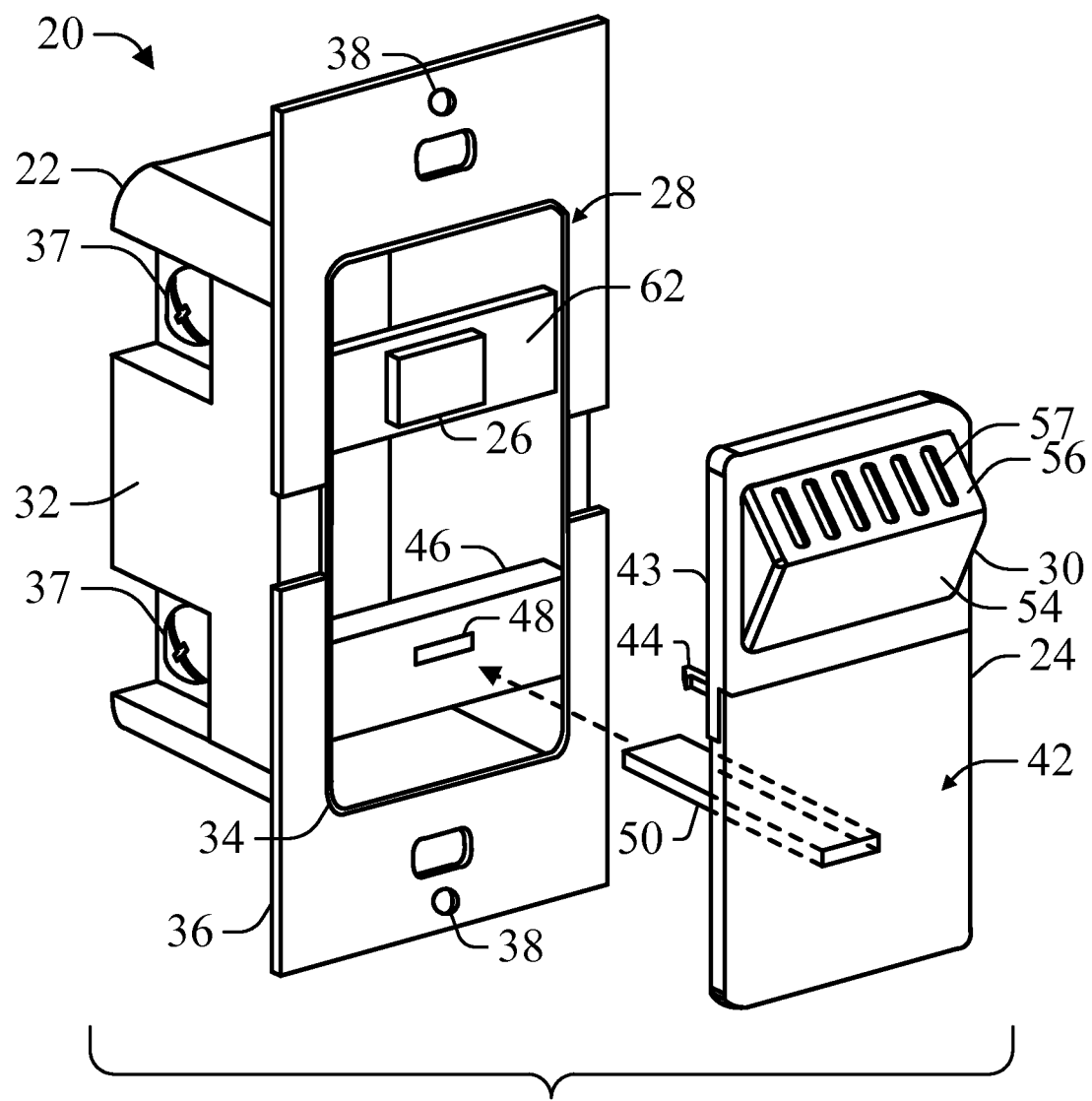
FIG. 2 is a partially exploded view of the humidity sensor system depicted in FIG. 1.
Figure 3:
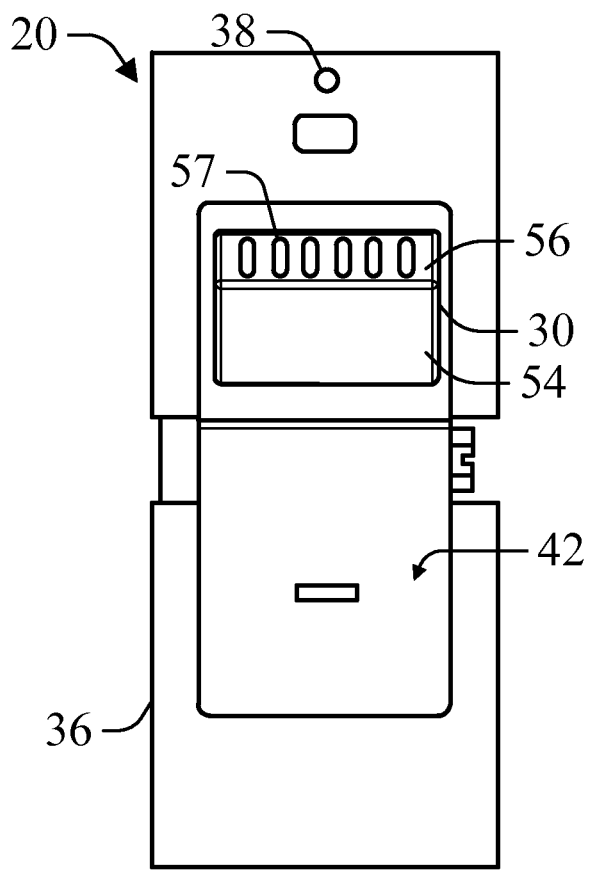
FIG. 3 is a front view of the humidity sensor system depicted in FIG. 1.
Figure 4:
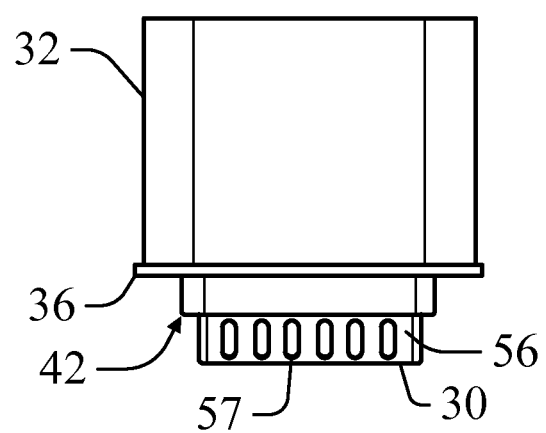
FIG. 4 is a top view of the humidity sensor system depicted in FIG. 1.
Figures 5A, 5B:
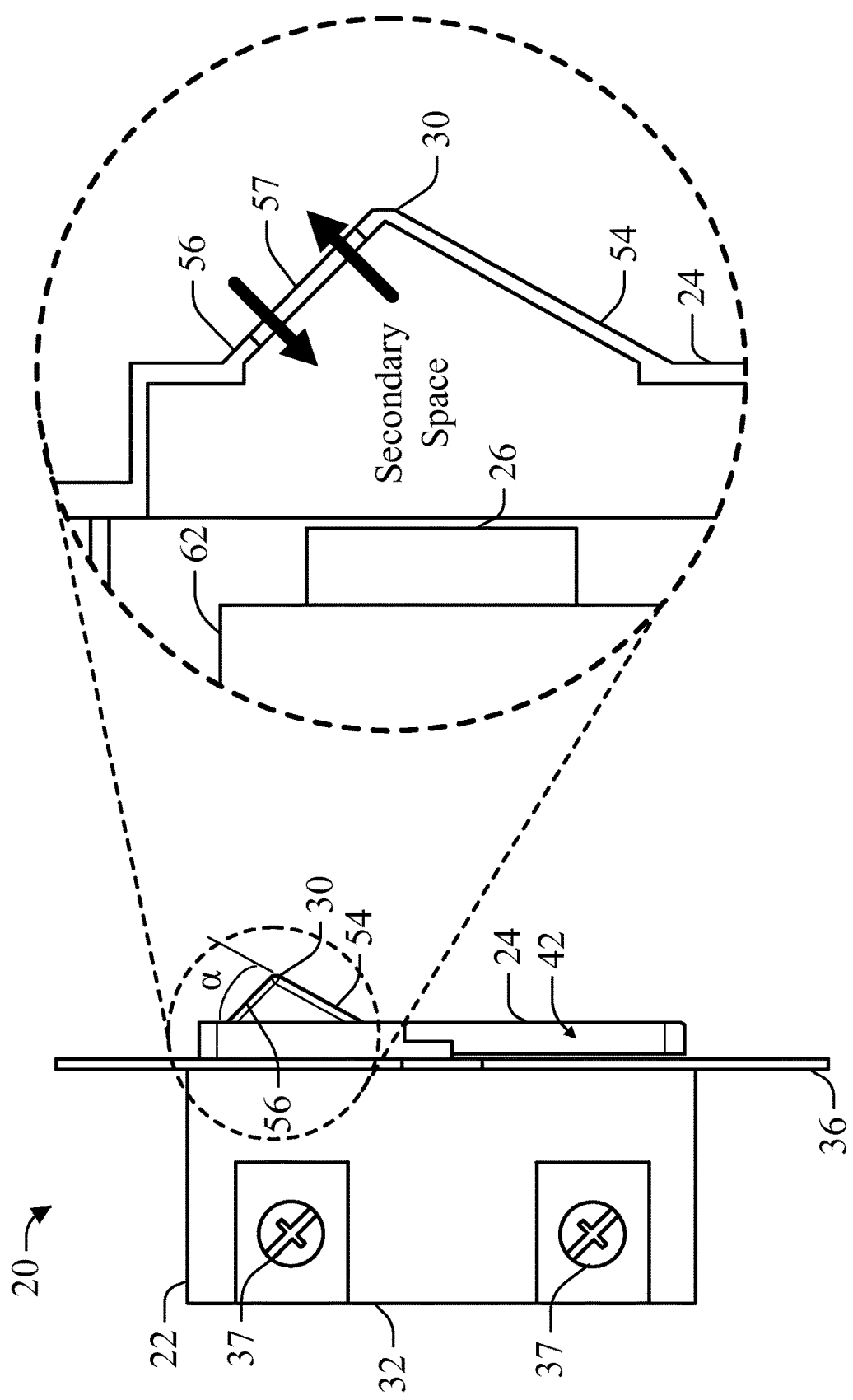
FIG. 5A is a side view of the humidity sensor system depicted in FIG. 1.
FIG. 5B is a partial cross-sectional side view of a portion of the humidity sensor system depicted in FIG. 5A.
Figure 6:
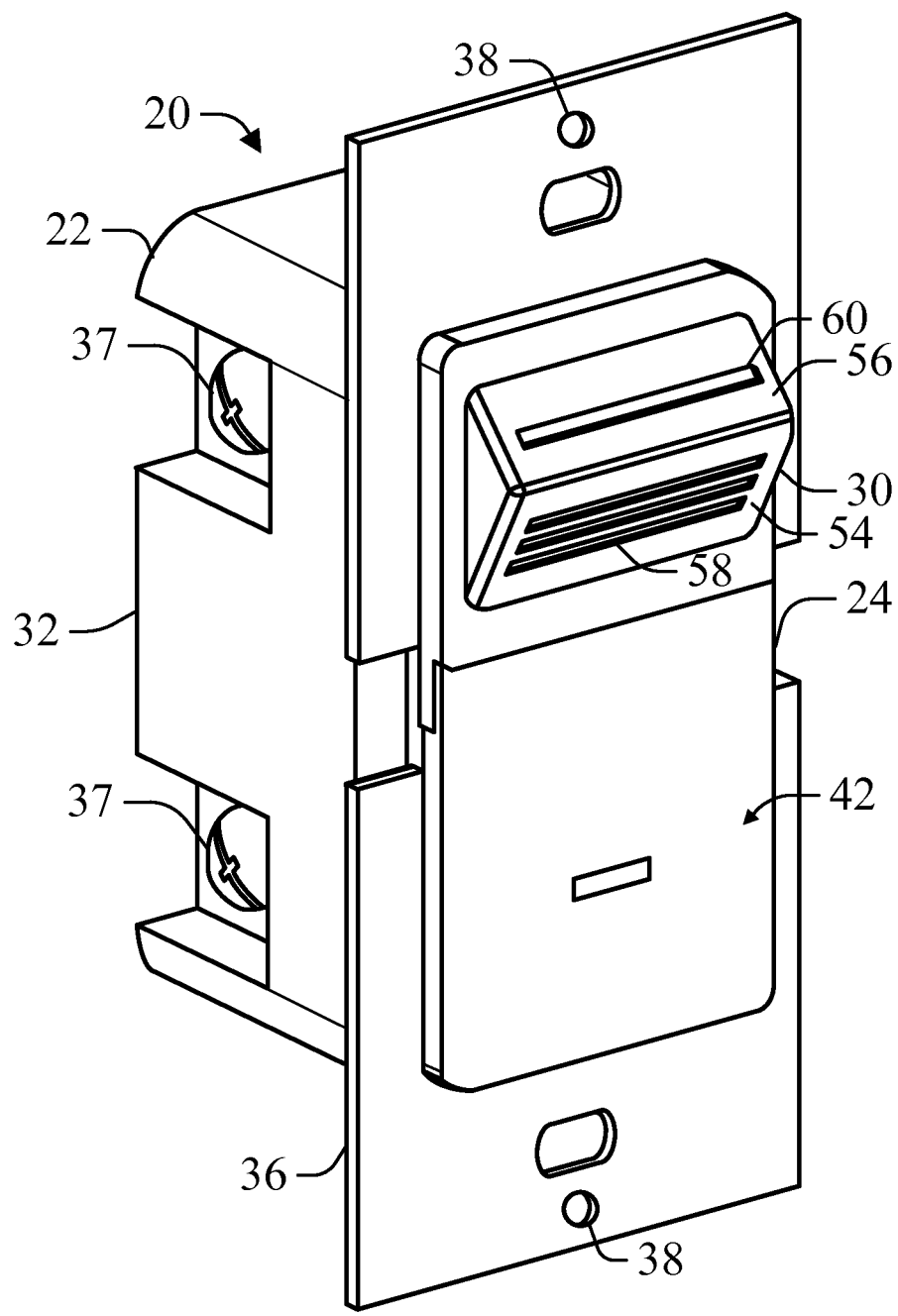
FIG. 6 is a perspective view of a humidity sensor system having inlet openings and outlet openings according to an example of the present disclosure.
Figure 7:
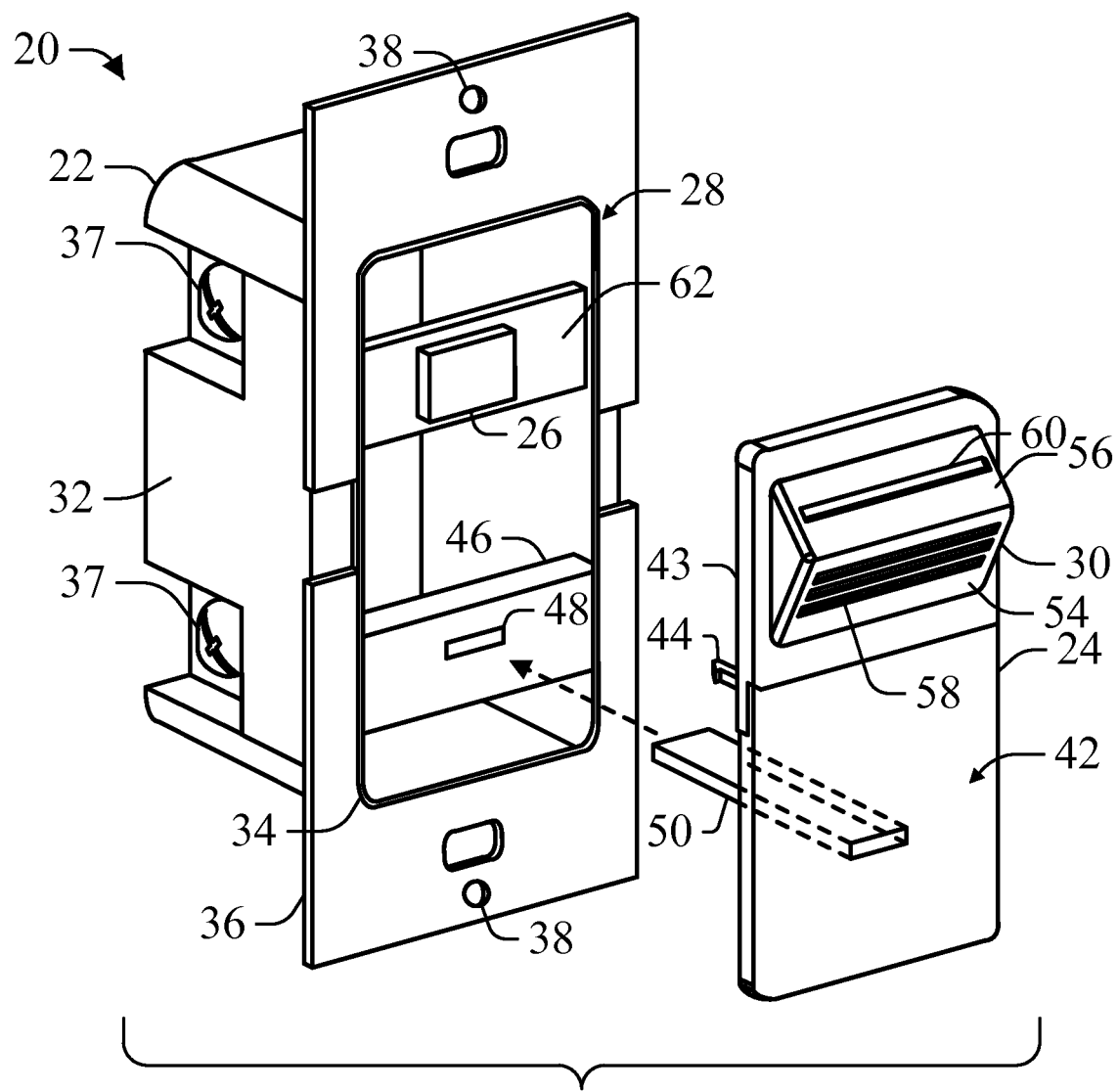
FIG. 7 is a partially exploded view of the humidity sensor system depicted in FIG. 6.
Figure 8:
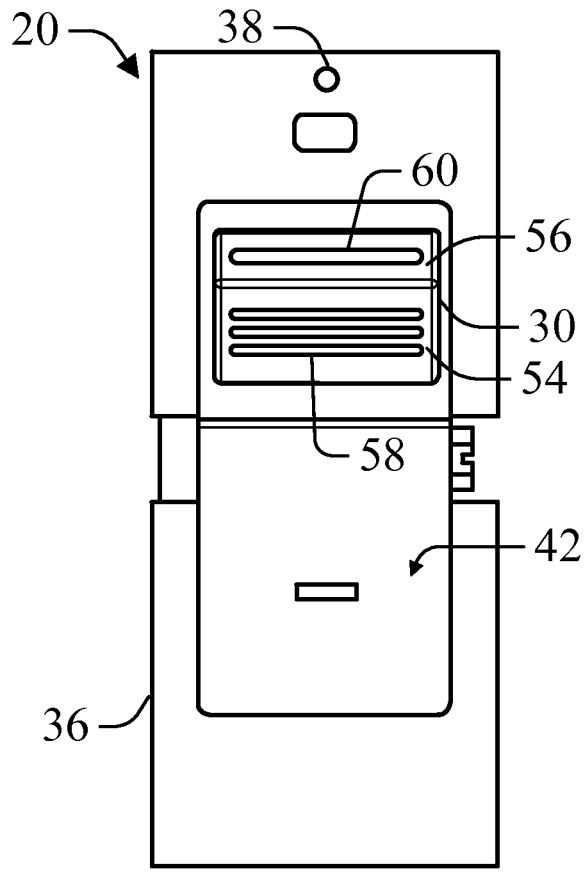
FIG. 8 is a front view of the humidity sensor system depicted in FIG. 6.
Figure 9:
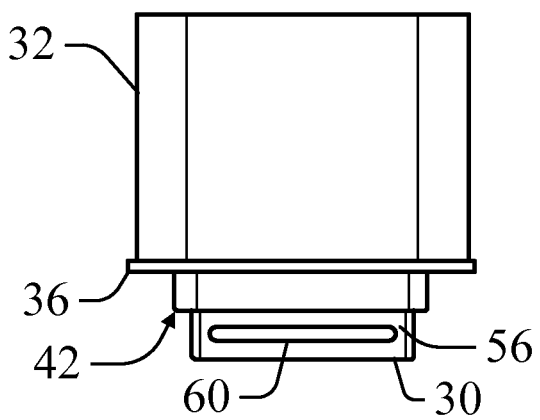
FIG. 9 is a top view of the humidity sensor system depicted in FIG. 6.
Figure 11:
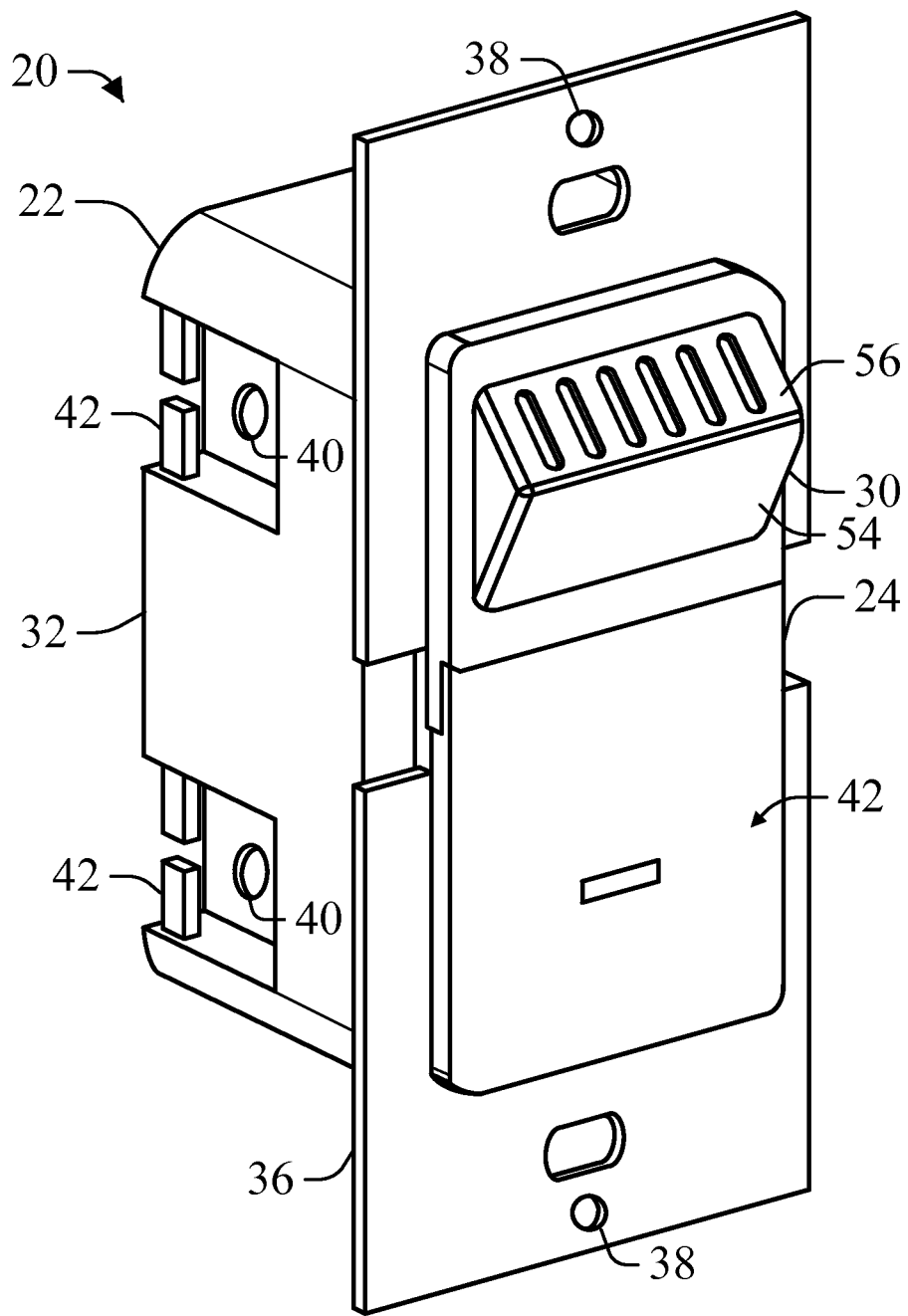
FIG. 11 is a perspective view of a humidity sensor system having a cable guide according to an example of the present disclosure.

As depicted in FIGS. 2 and 7, in an example, the housing 20 can include a housing wall 32 defining the front opening 28 and the internal space. The housing wall 32 can include a lip portion 34 and a plate portion 36. The plate portion 36 can extend radially outward from the front opening 28. In at least one example, the plate portion 36 can define at least one fastener opening 38 configured to receive at least one fastener to secure the plate portion 36 and correspondingly the housing 20 to a support surface or other structure. As depicted in FIGS. 1-2 and 6-7, in an example, the housing wall 32 can receive a fastener receiving portion 37 for receiving a fastener to mount the housing wall 32 to a support structure such as a building stud or other structure. As depicted in FIG. 11, in at least one example, the housing wall 32 can include at least one cable port 40 for passing a cable through the housing wall 32. The cable port 40 can include at least one cable guide 42 that can be releasably engaged to a cable extending through the cable port 40 to guide and orient the cable along the exterior of the housing wall 32.

As depicted in FIGS. 1-4 and 6-9, in an example, the face plate 24 can include a base portion 42 and an edge portion 43. The edge portion 43 can be engaged to the lip portion 34 of the housing 20 to position the face plate 34 within the front opening 28 such that the face plate 24 extends over at least a portion of the front opening 28. As depicted in FIGS. 2 and 7, in at least one example, the face plate 24 includes a hook element 44 positioned on the edge portion 43 to engage the lip portion 34 of the housing 20 to releasably engage the face plate 24 to the housing 20 when the face plate 24 is positioned within the front opening 28.

As depicted in FIGS. 2 and 7, in an example, the housing 20 can include a plate mount 46 positioned within the internal space of the housing wall 32. The plate mount 46 can define a slot 48 oriented toward the front opening 28. The face plate 24 can include a plate 50 extending from the base portion 42 and insertable into the slot 48 to align the face plate 24 with the front opening 28. The plate 50 can cooperate with the hook element 44 to engage the face plate 24 to the housing 20.

As depicted in FIGS. 1-10, the base portion 42 of the face plate 24 can include the extended portion 30. The extended portion 30 can extend from the base portion 42 to define a secondary space. The extended portion 30 includes a primary face 54 and a secondary face 56 angled relative to the base portion 42 to define the secondary space. As depicted in FIGS. 5A-5B and 10A-10B, the primary face 54 can be angled along a primary axis transverse to the base portion 42 by an angle α. The base portion 42 can be oriented such that the base portion 42 is generally parallel to the wall in which the housing 22 is mounted. In at least one example, angle α is between about 20 to about 70 degrees. In at least one example, angle α is between about 45 degrees.

As depicted in FIGS. 1-10, in an example, the extended portion 30 can be positioned on the face plate 24 such that the secondary space is adjacent the humidity sensor 26. As depicted in FIGS. 1-5, in at least one example, the secondary face 56 can define a plurality of vent openings 57. Humid ambient air can enter the secondary space through the plurality of vent openings 57 such that the humid air circulates over the humidity sensor 26 as illustrated in FIGS. 5A-5B. The circulated humid air improves contact between the ambient air and the humidity sensor 26 reducing response time and improving detection of undesirable humidity levels. In this configuration, the extended portion 30 operates as a scoop in which air is collected through the vent opening 57 to bring humid air proximate to the humidity sensor 26. The extended portion 30 can be oriented to collect rising humid air or falling air to improve measurement of the ambient air.

As depicted in FIGS. 6-10, in at least one example, the primary face 54 can include at least one inlet port 58 for receiving an inlet air flow of ambient humid air into the secondary space. The secondary space 56 can include at least one outlet port 60 through which an outlet air flow can exit the secondary space. In the embodiments depicted in FIGS. 6-13, the primary face defines more inlet openings (i.e. three) than the secondary face defines outlet openings (i.e. one). The humid airflow over the humidity sensor 26 improves contact between the ambient air and the humidity sensor 26 reducing response time and improving detection of undesirable humidity levels.

Figures 10A, 10B:
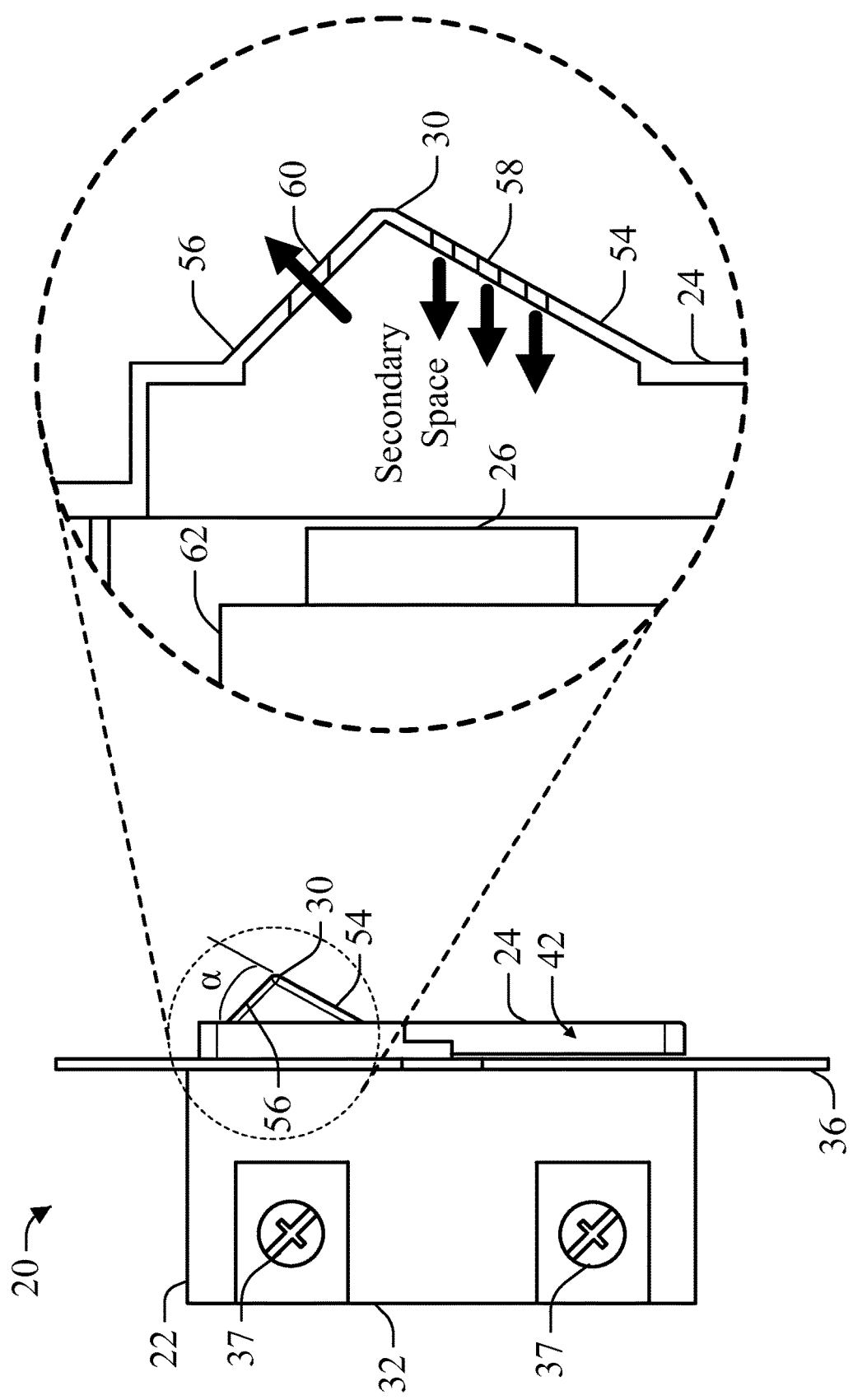
FIG. 10A is a side view of the humidity sensor system depicted in FIG. 6.
FIG. 10B is a partial cross-sectional side view of a portion of the humidity sensor system depicted in FIG. 10A.

As illustrated in FIGS. 10A-10B, the primary face 54 can be angled along a primary axis by angle α transverse to the base portion 42. In at least one example, the primary axis orients the primary face 54 and the correspondingly inlet ports 58 generally downward when the plate portion 36 is oriented vertically. In this configuration, rising humid air enters the secondary space through the downwardly oriented inlet ports 58. The secondary face 56 is oriented along a secondary axis transverse to the primary axis such that the rising humid air continues through the secondary space and exits through an outlet port 60. The humid air travels along an air flow path within the secondary space between the inlet port 58 and the outlet port 60. In certain examples, the humid air can travel in the reverse direction through an outlet port 60 and out the inlet port 58.

As depicted in FIGS. 2 and 7, the housing 22 can include a sensor bracket 62 positioned proximate the front opening 28. The sensor bracket 62 is configured to receive at least one humidity sensor 26 and position the humidity sensor 26 to intersect the air flow path within the secondary space.

In an example, the humidity sensor 26 can be operably connected to a controller. The humidity sensor 26 can signal the controller if the humidity sensor 26 detects humidity outside a predetermined threshold. The controller can be operably connected to a humidity controller element. The humidity controller element can comprise an exhaust fan for venting humid air from the room or other element for raising or lowering the ambient humidity.

Figure 12:
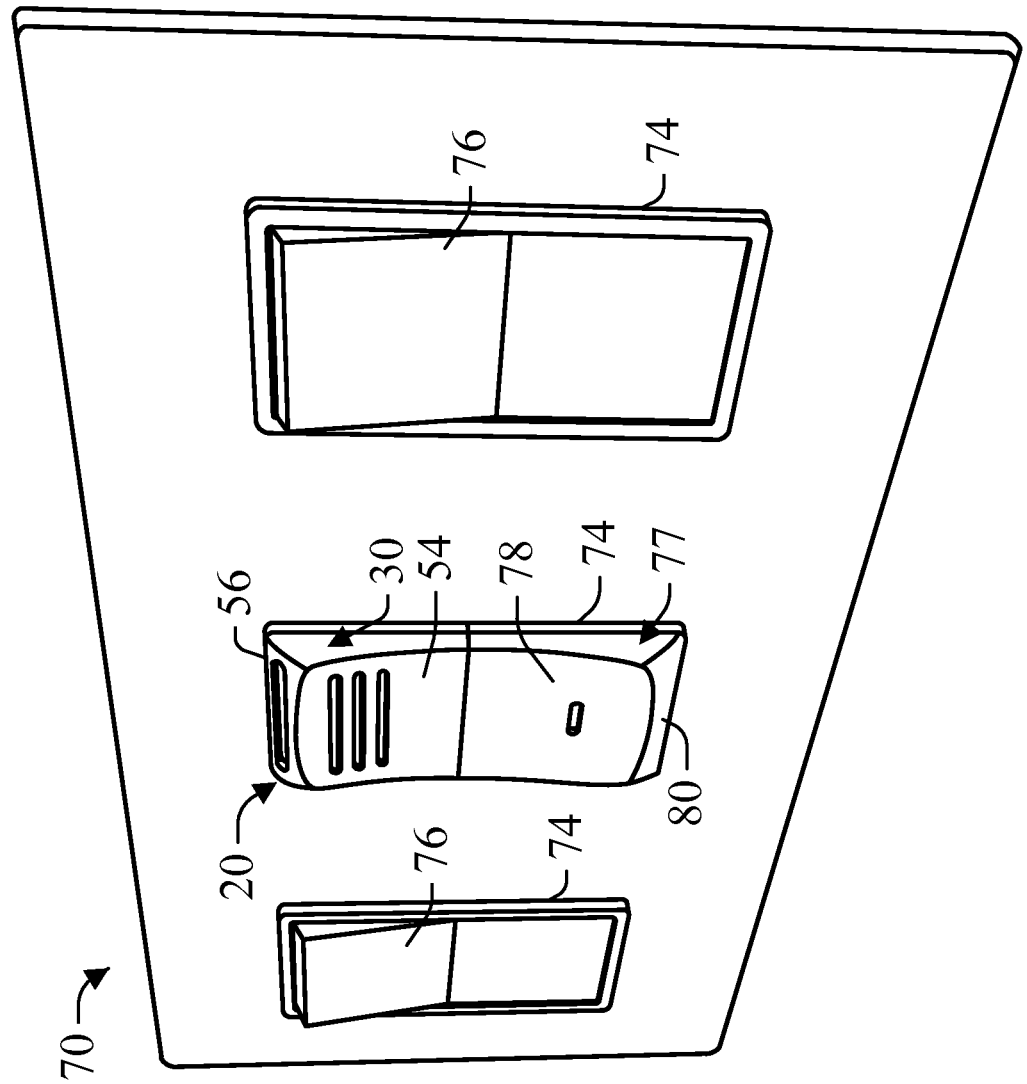
FIG. 12 is a light switch assembly having an integrated humidity sensor according to an example of the present invention.
Figure 13:
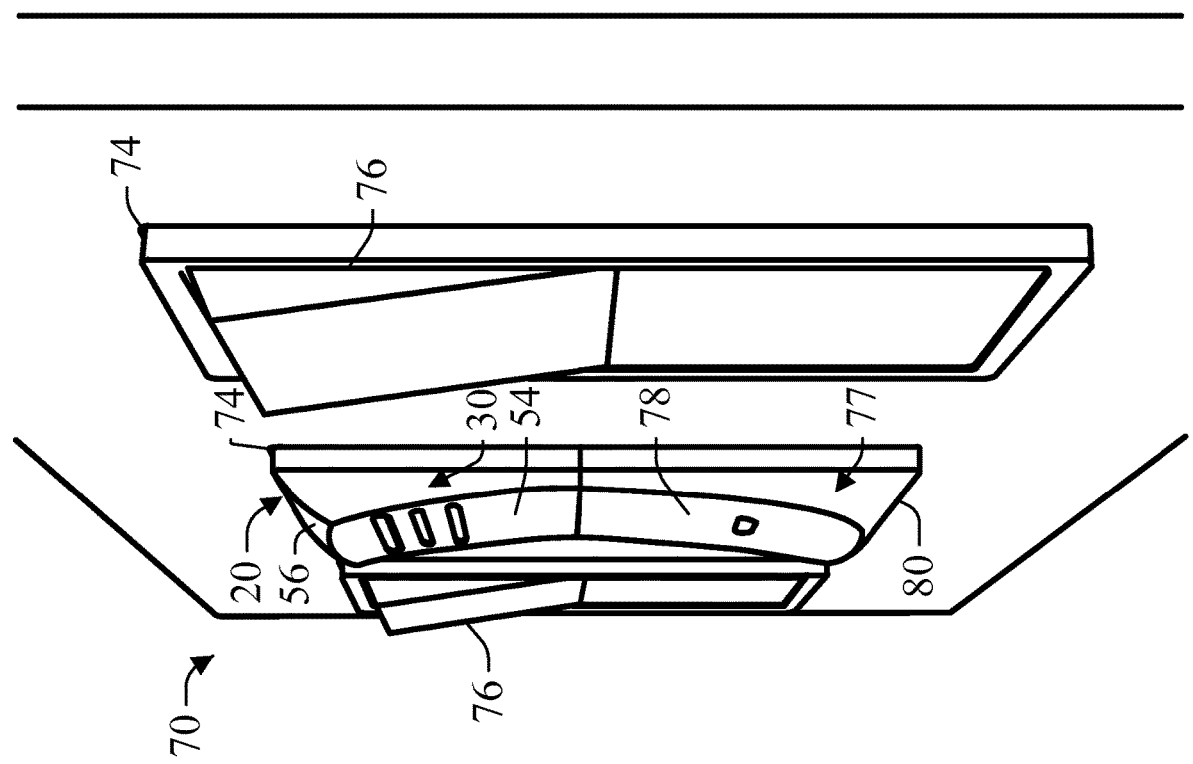
FIG. 13 is a perspective view of the light switch assembly depicted in FIG. 12.

As depicted in FIGS. 12-13, in an example, the humidity sensor system 20 can be integrated into a light switch assembly 70 mountable within a wall opening. The light switch assembly 70 includes a switch plate 72 defining at least one switch opening 74. The switch plate 72 can include at least one fastener opening or mounting element for receiving at least one mounting fastener for mounting the switch plate 72 to a wall over a wall opening.

In an example, the light switch assembly 70 can include a light switch assembly include a toggle switch 76 positionable within one of the switch openings 74. As depicted in FIGS. 12-13, in at least one example, the toggle switch 76 can be a pivot type toggle switch having two angled contact surfaces to which pressure can be applied to pivot the toggle switch between a first pivot position and a second pivot position.

In an example, the face plate 24 can include a mirror extended portion 77 having a mirror primary face 78 and a mirror secondary face 80. The mirror primary face 78 can be angled along an axis opposite the primary axis of the primary face 54 and the mirror secondary face 80 can be angled along an axis opposite the secondary axis of the secondary face 56. In this configuration, the primary face 54 and the mirror primary face 78 are angled to correspond to the angled contact surfaces of the toggle switch 76 such that the face plate 24 resembles the toggle switch 76 when inserted through the switch opening 74.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A humidity monitoring system mountable to a wall, comprising:

a housing comprising a housing wall defining an internal space and a front opening;

a face plate comprising a base portion and an extended portion extending outward from the base portion to define a secondary space, the extended portion comprising:
  a primary face defining at least one inlet opening for receiving an inlet humid airflow into the secondary space, the primary face angled along a primary axis configured to be oriented transverse to a vertical axis when the face plate is mounted to the housing such that the primary face is oriented downward such that rising humid air enters the at least one inlet opening to create a humid airflow along the airflow path in the secondary space; and
  a secondary face angled along a secondary axis transverse to the primary axis, the secondary face defining at least one outlet opening for passing an outlet humid airflow from the secondary space; and
a humidity sensor positioned within the internal space proximate the front opening,
the base portion of the face plate being mountable to the housing wall to obstruct at least a portion of the front opening and to arrange the secondary space outside of the internal space and adjacent the humidity sensor.

2. The humidity monitoring system of claim 1, the housing comprising: a plate portion extending from the housing wall radially outward from the front opening.

3. The humidity monitoring system of claim 2, wherein the plate portion defines at least one fastener port for receiving at least one fastener for mounting the housing.

4. The humidity monitoring system of claim 1 wherein the secondary face is oriented along an axis transverse to the primary face when the face plate is mounted to the housing such that the humid airflow exits the secondary space through the at least one outlet opening.

5. The humidity monitory system of claim 1, the extended portion comprising a secondary face defining at least one vent opening for receiving ambient humid air into the secondary space.

6. The humidity monitoring system of claim 1, the face plate comprising:
  a mirror extended portion comprising:
    a mirror primary face angled to mirror the primary face; and
    a mirror secondary face angled to mirror the secondary face.

7. The humidity monitoring system of claim 1, the housing comprising a mounting bracket defining a slot; and wherein the face plate comprises a plate insertable into the slot to align the face plate with the front opening.

8. The humidity monitoring system of claim 1, the housing comprising a lip portion adjacent the front opening; and wherein the face plate comprising an edge engagable to the lip portion.

9. The humidity monitoring system of claim 8, the face plate comprising at least one latch positioned at the edge; wherein the latch is engagable to the lip portion to secure the face plate to the housing.

10. A light switch assembly mountable to a wall, comprising:
  a switch plate defining at least two switch openings, the switch plate being mountable to the wall;
  at least one toggle switch positioned within one of the switch openings;
  a humidity sensor assembly positionable within one of the switch openings, the humidity sensor assembly comprising:
    a housing comprising a housing wall defining an internal space and a front opening;
    a face plate comprising a base portion and an extended portion extending outward from the base portion to define a secondary space, the extended portion comprising:
      a primary face defining at least one inlet opening for receiving an inlet humid airflow into the secondary space, the primary face angled along a primary axis configured to be oriented transverse to a vertical axis when the face plate is mounted to the housing such that the primary face is oriented downward such that rising humid air enters the at least one inlet opening to create a humid airflow along the airflow path in the secondary space; and
      a secondary face angled along a secondary axis transverse to the primary axis, the secondary face defining at least one outlet opening for passing an outlet humid airflow from the secondary space; and
    a humidity sensor positioned within the internal space proximate the front opening, the base portion of the face plate being mountable to the housing wall to obstruct at least a portion of the front opening and to arrange the secondary space outside of the internal space and adjacent the humidity sensor.

11. The light switch assembly of claim 10, the housing comprising: a plate portion extending from the housing wall radially outward from the front opening.

12. The light switch assembly of claim 11, wherein the plate portion defines at least one fastener port for receiving at least one fastener for mounting the housing to the switch plate.

13. The light switch assembly of claim 10, wherein the secondary face is oriented along an axis transverse to the primary face when the face plate is mounted to the housing such that the humid airflow exits the secondary space through the at least one outlet opening.

14. The light switch assembly of claim 10, the extended portion comprising a secondary face defining at least one vent opening for receiving ambient humid air into the secondary space.

15. The light switch assembly of claim 10, the face plate comprising:
  a mirror extended portion comprising:
    a mirror primary face angled to mirror the primary face; and
    a mirror secondary face angled to mirror the secondary face,
    wherein the mirror extended portion and extended portion cooperate to visually resemble the toggle switch.

16. The light switch assembly of claim 10, the housing comprising a mounting bracket defining a slot; and wherein the face plate comprises a plate insertable into the slot to align the face plate with the front opening.

17. The light switch assembly of claim 10, the housing comprising a lip portion adjacent the front opening; and wherein the face plate comprising an edge engagable to the lip portion.

18. The light switch assembly of claim 17, the face plate comprising at least one latch positioned at the edge; wherein the latch is engagable to the lip portion to secure the face plate to the housing.

19. A monitoring system mountable to a wall, comprising:
  a housing comprising a housing wall defining an internal space and a front opening;

a face plate comprising a base portion and an extended portion extending outward from the base portion to define a secondary space, the extended portion comprising:
- a primary face defining at least one inlet opening for receiving an inlet airflow into the secondary space, the primary face angled along a primary axis configured to be oriented transverse to a vertical axis when the face plate is mounted to the housing such that the primary face is oriented downward such that air may enter the at least one inlet opening to create an airflow along the airflow path in the secondary space; and
- a secondary face angled along a secondary axis transverse to the primary axis, the secondary face defining at least one outlet opening for facilitating an outlet airflow from the secondary space; and a sensor positioned within the internal space proximate the front opening, the base portion of the face plate being mountable to the housing wall to obstruct at least a portion of the front opening and to arrange the secondary space outside of the internal space and adjacent the sensor.

20. The monitoring system of claim 19, the sensor being a humidity sensor.

21. The monitoring system of claim 1, the primary face defines more inlet openings than the secondary face defines outlet openings.

22. The monitoring system of claim 21, the primary face defining three inlet openings and the secondary face defining one outlet opening.

23. The monitoring system of claim 10, the primary face defines more inlet openings than the secondary face defines outlet openings.

24. The monitoring system of claim 23, the primary face defining three inlet openings and the secondary face defining one outlet opening.

25. The monitoring system of claim 19, the primary face defines more inlet openings than the secondary face defines outlet openings.

26. The monitoring system of claim 25, the primary face defining three inlet openings and the secondary face defining one outlet opening.

* * * * *